US007581003B2

(12) United States Patent
Macbeth et al.

(10) Patent No.: US 7,581,003 B2
(45) Date of Patent: Aug. 25, 2009

(54) SYSTEM AND METHOD FOR AUTOMATIC RECOVERY FROM FAULT CONDITIONS IN NETWORKED COMPUTER SERVICES

(75) Inventors: Randall J. Macbeth, West Edmonds, WA (US); Marcelo Aizenstein Furman Calbucci, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 10/748,675

(22) Filed: Dec. 31, 2003

(65) Prior Publication Data

US 2005/0193225 A1    Sep. 1, 2005

(51) Int. Cl.
    *G06F 15/173*    (2006.01)
(52) U.S. Cl. .............................. 709/225; 709/217; 707/6
(58) Field of Classification Search .................. 709/225, 709/217
    See application file for complete search history.

(56) References Cited

U.S. PATENT DOCUMENTS

| 7,058,695 | B2* | 6/2006 | Takagi et al. ............... 709/217 |
| 2002/0042823 | A1* | 4/2002 | DeBettencourt et al. .... 709/224 |
| 2002/0169889 | A1* | 11/2002 | Yang et al. ................... 709/244 |
| 2003/0204769 | A1* | 10/2003 | Coughlin ....................... 714/4 |
| 2006/0020699 | A1* | 1/2006 | D'Esposito ................. 709/224 |
| 2006/0123012 | A1* | 6/2006 | Barth .......................... 707/10 |

\* cited by examiner

*Primary Examiner*—John Follansbee
*Assistant Examiner*—Glenford Madamba
(74) *Attorney, Agent, or Firm*—Shook, Hardy & Bacon LLP

(57) ABSTRACT

A system and related techniques monitor the operation of networked computer services, such as Internet-based search or other services which may link to a set of server resources, supporting databases and other components. In current technology if a large-scale or other search service encounters a problem in one supporting platform, the overall response may be interrupted or hang. In embodiments for example a search engine which attempts to access a travel, shopping, news or other database or service in response to a user search request may suspend the delivery of the search results, or blank the page with a 404 or other error message, due to the. unavailability of one or two databases or other components. The service support platform of the invention on the other hand may monitor the computer services network and detect the occurrence of a failure or performance lag, and temporarily detach the faulted server or other resource from the larger network service. In embodiments a user's Web page may be adapted to omit a panel of information related to that suspended service or component, so that for example an icon for a travel map or hotel reservation tool may be grayed out or removed while still presenting the remainder of the services or options. Users may therefore still access the majority of the Web service they are attempting to use, without interruption or noticeable lag.

31 Claims, 4 Drawing Sheets

SYSTEM AND METHOD FOR AUTOMATIC RECOVERY FROM FAULT CONDITIONS IN NETWORKED COMPUTER SERVICES

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of network communications, and more particularly to a platform to monitor the overall performance and other operation of a computer network service, and to automatically deactivate or reroute defaulted services or connections to preserve service responsiveness.

BACKGROUND OF THE INVENTION

Deployment of networked computer services, such as Internet search engines, email, messaging and other communications platforms and others continue to expand and proliferate. Those and other services require Internet service providers (ISPs) and others to deploy increasingly capable back-end infrastructure to support the range and responsiveness of service expected by consumers, businesses and others. Installation of those resources, such as server farms, high-volume databases and others, in turn leads to demands for increased platform connectivity and results in greater dependency on all service components to cooperate effectively to deliver the search or other services.

However, in an extensive installation such as a server farm arranged to support and Internet search engine or other application, the interdependency of numerous machines, connections and software may lead to faults or performance degradation in user-side performance when any one or more of the component resources crashes or becomes otherwise inoperable. For example a collection of servers which access travel, hotel and other remote data sources may hang or crash when executing a search on "Hawaii" or other terms when connections to one or more remote databases break or degrade. A user viewing a search page may therefore be presented with a blank screen, 404 error or other interruption of failure notification. This may occur even when other components, connections or data sources are still functioning and could perhaps return data to be presented to the user.

In network service installations, to address that type of service interruption some operators may choose to install network monitoring packages which generate alerts to systems administrators, to advise them for example the processor utilization has become dangerously high on one group of servers, or that a backbone connection to a data source has broken down. This may permit the system administrator or other to step in and manually adjust communications links, activate redundant servers or take other actions. However, such arrangements still require the intervention and judgment of a human operator to sense and balance network performance in the presence of faults and other conditions. This among other things may lead to errors in judgment or a response time which is not acceptable or optimal during urgent network outages or conditions. Moreover human operators may only have the ability to monitor and act on a fairly limited number of connections or other resources for emergency override purposes. Other problems in the management of networked computer services and the reliable operation of those services exist.

SUMMARY OF THE INVENTION

The invention overcoming these and other problems in the art relates in one regard to a system and method for automatic recovery from fault conditions in networked computer services, in which one or more network monitors collect data on the performance of network servers, storage, connections and other resources and report network status data back to a control engine. In embodiments, the control engine may be configured with a rules-based logic engine which monitors the network performance data to detect and isolate emerging faults or other anomalous conditions, for example by detecting processor overload in a server or group of servers or a connection fault to a data source. Upon detecting that condition the control engine may automatically generate control commands to deactivate, disconnect or otherwise respond to the faulted server, connection or other resource. The end user or users accessing the affected resource, such as a search page, may consequently continue to view and receive results of the service, but with the failed component removed from the output or user interface. The control engine may likewise restore the faulted server, connection or other resources when the anomaly is removed, and may readjust other services to compensate for the affected service during the fault. According to embodiments of the invention in one regard, the resulting ability to monitor overall service health and "throw a switch" on one or more services when faults occur may occur may take place without necessary human intervention, although in implementations human operator overrides may be permitted.

DETAILED DESCRIPTION OF EMBODIMENTS

Figure 1:
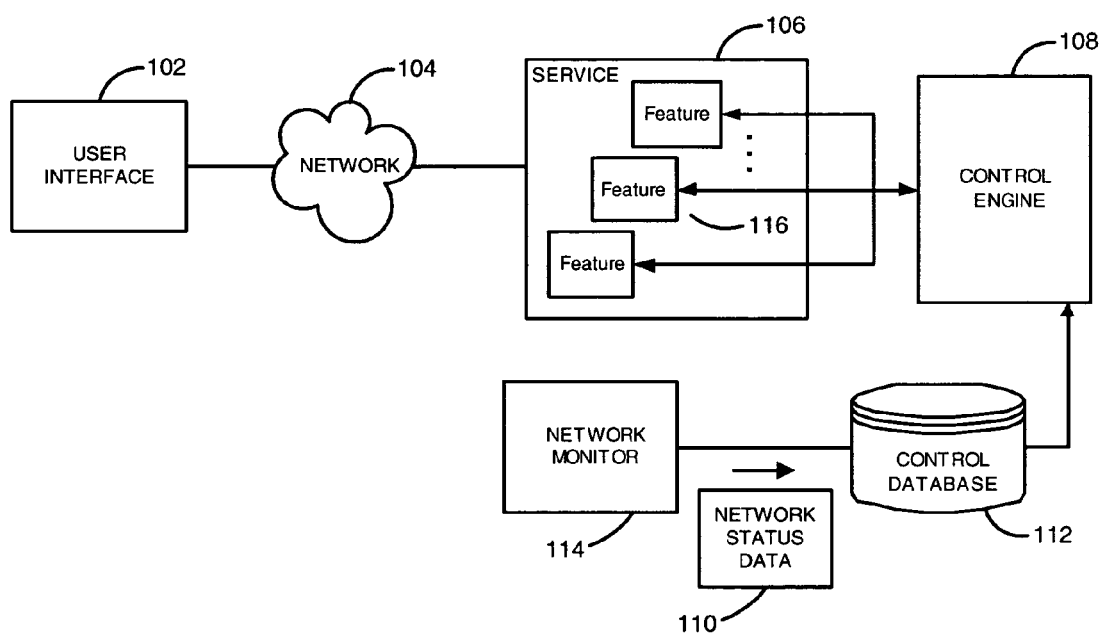
FIG. 1 illustrates an network architecture in which a platform for automated recovery from a fault in networked computer services may operate, according to embodiments of the invention.

FIG. 1 illustrates an architecture in which a system and method for automatic recovery from fault conditions in networked computer services may operate, according to an embodiment of the invention. As illustrated in that figure a consumer, corporate or other user may operate a user interface 102 to access a networked computer service 106 via a network 104, which may for example be, include or interface to the Internet, a local area network (LAN) or other network or connection. The service 106 to which the user connects via network 104 may be or include, for example, a search engine such as an Internet search engine which may search Web indices or other data stores for matching words, pictures or other content. Service 106 may likewise include communications or messaging services such as Microsoft Network Messenger™, an email client or service, a picture or other media exchange facility, or other applications or services.

In the environment as shown, in operation the user or users may be presented with a Web page or other service or content via user interface 102, which may be or include a browser or other client. The service or content presented via the user interface 102 may as shown include a set of features 106, such as linkable search results, email or other message links, advertising displays or applets, or other media, content or services. For example a user performing a search via a search engine may be presented with a set of configuration settings to control their search activity, for instance to restrict results to Web pages in English or other languages, or to permit the display of related or paid advertising sites.

Each feature in the set of features 106 may in turn interface to, communicate with or access other local or remote resources to support that feature. For example in a search engine application, a travel or vacation feature may connect to remote servers which serve selectable airfares, hotels or other related data or services. Other resources, such as databases or communications or messaging platforms, may likewise support and connect to the set of features 106. In embodiments, various of the set of features 106 may operate simultaneously, independently or in dependence on each other, the total interaction of which may contribute to the responsiveness and quality of the user's perceived experience when accessing service 106.

To manage and control potential faults, failures, degradations or interruptions in that content or other delivery, according to the invention in one regard a control engine 108 may communicate with service 106 to monitor the health, status and performance of that service. Control engine 108 may be, include or be supported by server or other resources to maintain and dynamically adapt service 106 and supporting resources in the face of connection breakdowns, database outages and other faults and conditions. In configurations as shown, the control engine 108 may communicate with a control database 112, such as a relational database such as a structured query language (SQL) database or others, which in turn receives data from a network monitor 114.

Network monitor 114 may be or include a set of data capture ("sniffing") tools, connection monitoring or other functionalities which access and detect network status data 110 from any one or more components or services supporting the service 106, including network 104, connections to and from that network, processor and memory utilization in supporting servers or other machines, page latency in Web or other pages viewed by the user in user interface 102, or other parameters of network 104, service 106 or related resources. Network monitor 114 may for example be configured to monitor or "listen" to selected TCP/IP (transfer control protocol/Internet protocol) ports or other channels or interfaces to collect that network status data 110. That network status data 110 may be transmitted, streamed, sampled or stored to control database 112 for service management purposes.

Figure 2:
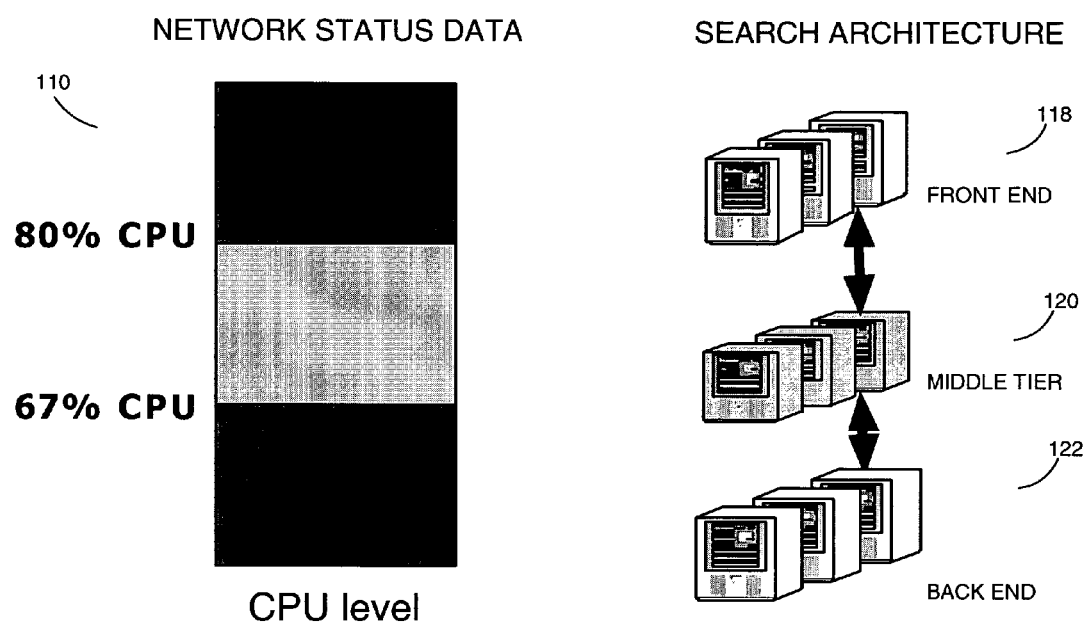
FIG. 2 illustrates monitoring of network status data, according to embodiments of the invention.

As illustrated in FIG. 2, in embodiments the service 106 so managed may for example be or include a search engine, which service may be supported by a set of server, storage and other resources including a front end 118 for receiving search requests, a middle tier 120 for conditioning those requests, for example using SQL or other query formats, and a backend 122 such as a database server or other data or analytic store. In embodiments involving a search engine application as part of service 106 as illustratively shown, the network monitor 114 may monitor the percentage of CPU utilization in front end 118, middle tier or back end 122 as part of the network status data 110, as shown. In embodiments a certain level of processor loading or other threshold or condition may be configured to trigger the detection of a system fault or other anomalous condition in control engine 108, such as 80% or other processor loading over a certain or sustained amount of time.

When a fault, performance degradation or other condition is detected in this fashion, the control engine 108 may communicate control commands to the service 106 to dynamically adjust or alter the set of features 116 in response to the detected condition. For example if processor utilization has remained over threshold for a period of time in a server supporting a Web site which may normally be returned in search results, in embodiments the link to that site may be removed or deactivated to prevent users from attempting to link to that site while the exception or condition is taking place.

Figure 3:
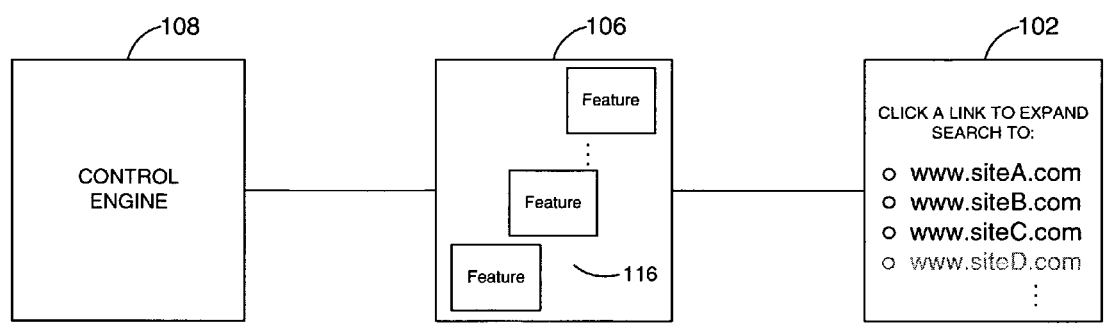
FIG. 3 illustrates dynamic feature or service adjustment, according to embodiments of the invention.

As illustrated in FIG. 3, the control engine may for example dynamically adjust the set of features 116 of service 106 to ghost out or deactivate the normally available link for "www.siteD.com" due to processor loading at that site, connection difficulties with that site, or other conditions. By selectively deactivating that or other features in the set of features 116, the user may still be presented with useful information in user interface 102, so that the service 106 may continue while partial faults or degradations take place. Moreover since control engine 108 may detect and respond to one or more network conditions on an automated basis, control actions may be taken on a realtime or near-realtime basis, which may be advantageous in cases of particularly severe or sudden faults. Moreover because the control engine 108 consolidates the monitoring of all points of support for service 106 in an integrated fashion, more than one of the set of features 116 or other service components may be controlled or deactivated at the same time in a coordinated fashion. That control oversight may also be configured to be conditional, for example to at first deactivate or suspend two or three of the set of features 116 when multiple or relatively widespread failures are being reported, to attempt to isolate the root or greatest contributing cause of the service fault or failure.

It may be also noted that in embodiments, the control commands and service adjustments generated by control engine 108 may be monitored or over-ridden by human administrators, when that configuration option is desired. Control engine 108 may in embodiments be configured to restore or release the deactivations or other adjustments to service 106, when the network status data 110 reflects that the fault, degradation or other condition has been alleviated. Decisioning on which resources to deactivate, reduce, adjust or otherwise manage in light of service or network conditions may in embodiments be supported or driven by rules-based logic in control engine 108, for example to adjust thresholds or other triggers depending on time of day, bandwidth utilization, user traffic and other variables. Other control options are possible.

Figure 4:
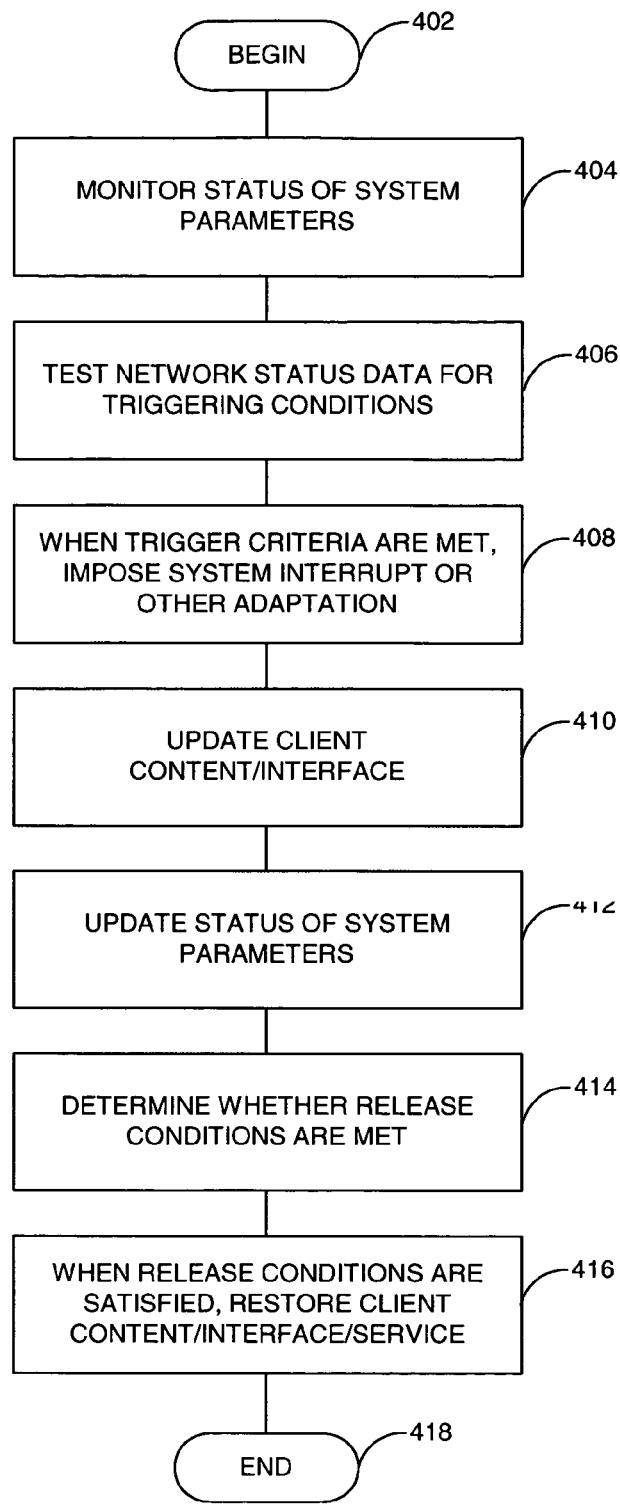
FIG. 4 illustrates a flowchart of overall fault recovery processing, according to embodiments of the invention.

FIG. 4 illustrates a flowchart of overall network monitoring and fault response processing, according to embodiments of the invention. In step 402, processing may begin. In step 404, the status of network system parameters may be monitored, for instance via network monitor 114 or other access points. The captured network status data 110 may include for instance processor utilization rates, memory or storage usage, effective bandwidth, suspended or broken connections, page latency or other network or other conditions or parameters. In step 406, the network status data 110 reported by network monitor 114 or other tools or resources may be examined to determine whether network fault or other triggering conditions may exist, for example to determine whether a fault or other threshold has been met, for instance when processor utilization has reached 80% for an hour or other period, memory usage has instantaneously reached 90% or other levels, a backbone or other connection has been lost or degraded, or other triggering conditions or events are reported. The fault detection may in embodiments be performed by executing rules-based logic in control engine 108, for example by accessing control database 112 to load a threshold or group of related or conditional thresholds.

In step 408 when triggering conditions are detected, the control engine 114 may communicate a control command such as an interrupt to a faulted service or connection to deactivate, remove, suspend or otherwise manage the impact of that failure on the set of features 116 or other aspects of end-user experience or other performance variables. In step 410, the user interface 102 or content presented via that interface may for example be updated. For example in a search results page, an unavailable link may be ghosted out while still presenting other search results or other fields.

In step 412, the control engine 108 may further monitor and update the network status data and associated parameters, to determine any new or revised conditions arising from or related to the pending fault, or to detect unrelated anomalies. In step 414, the control engine 108 may determine whether release conditions have been met, so that the remedial actions taken in response to the current fault may be released. For example if a backbone connection has been verified to be restored, a total number of permitted users on an Internet site may be restored to two hundred from twenty, or other adjustments may be made or features in the set of features 116 reactivated. In step 416, when release or recovery conditions are met, the client interface 102 and related content may be dynamically restored or adjusted to reincorporate the restored service or feature in the set of features 116, or to make other links or resources available. In step 418, processing may repeat, return to a prior processing point or terminate.

The foregoing description of the invention is illustrative, and modifications in configuration and implementation will occur to persons skilled in the art. For instance, while the invention has generally been described in terms of a platform in which a singe control engine monitors all service components, in embodiments the logic and other functions amalgamated in the control engine could be deployed in multiple or distributed control servers or other engines. The control database likewise may in embodiments be distributed across multiple data stores.

Similarly, while the invention has in embodiments been described as involving or supporting consumer-type networked services such as Internet search engines, other public or private, subscriber-based or non-subscriber based services or applications may be monitored and managed according to embodiments of the invention. Other hardware, software or other resources described as singular may in embodiments be distributed, and similarly in embodiments resources described as distributed may be combined. The scope of the invention is accordingly intended to be limited only by the following claims.

We claim:

1. A system for monitoring a networked computer service for fault recovery, the networked computer service comprising a set of features, the system comprising:
    an input interface to receive network status data from a network monitor monitoring a computer services network, wherein network status data comprises at least one of page latency data, processor utilization data, connection data and storage data;
    a control engine in a server device, the control engine communicating with the input interface to receive the network status data and automatically generate control commands to dynamically adjust the set of features based on a fault condition detected in the network status data, the fault condition associated with one or more features within the set of features, wherein the set of features normally provide a plurality of panels of information for presentation on one or more web pages provided by the networked computer service to one or more users, each feature corresponding to one or more of the plurality of panels of information, and wherein the fault condition comprises undesired performance degradation of the one or more features; and
    an output interface, the output interface communicating with the control engine and the computer services network, to transmit the control commands to the computer services network to dynamically adjust the set of features in response to the detection of the fault condition by deactivating the one or more features associated with the fault condition while maintaining active features in the set of features to continue to provide the one or more users with a portion of the networked computer service, the portion of the networked computer service comprising the active features while each of the one or more panels associated with the one or more features associated with the fault condition are at least temporarily removed from the networked computer service, such that the one or more web pages only include panels of information associated with the active features.

2. A system according to claim 1, wherein the computer services network comprises an Internet service.

3. A system according to claim 2, wherein the Internet service comprises a search service.

4. A system according to claim 1, wherein the fault condition comprises a failure of the network status data to meet a performance threshold.

5. A system according to claim 4, wherein the performance threshold comprises a minimum response time for a user of the networked computer services.

6. A system according to claim 1, wherein the control engine reactivates at least a portion of the one or more features upon restoration of predetermined network status data.

7. A system according to claim 1, wherein the control engine alters the operation of at least one active feature in compensation for deactivating the one or more features.

8. A system according to claim 1, wherein the control engine comprises a rules-based decisioning engine.

9. A system according to claim 8, wherein the rules-based decisioning engine interfaces to a control database storing at least one of the network status data and a set of service fault rules.

10. A system according to claim 1, further comprising a manual override selector, the manual override selector permitting an operator to override the control commands generated by the control engine.

11. A method for monitoring a networked computer service for fault recovery, the networked computer service comprising a set of features, the method comprising:
    receiving network status data from a network monitor monitoring a computer services network, wherein network status data comprises one of page latency data, processor utilization data connection data and storage data;
    automatically generating, by a control engine of a server device, control commands to deactivate one or more features based on a fault condition associated with the one or more features in the network status data while maintaining active features in the set of features to continue to provide a portion of the networked computer service, wherein the set of features normally provide a plurality of panels of information for presentation on one or more web pages provided by the networked computer service to one or more users, each feature corresponding to one or more of the plurality of panels of information, and wherein the fault condition comprises unintentional performance degradation in the presentation of one or more features; and communicating the control commands to the computer services network to respond to the fault condition by deactivating the one or more features associated with the fault condition while maintaining the active features in the set of features, thereby allowing the one or more users accessing the networked computer service to continue to receive a portion of the networked computer service, the portion of the networked computer service comprising only the active features while the one or more features associated with the fault condition are at least temporarily removed from the networked computer service, such that the web pages only include panels of information associated with the active features.

12. A method according to claim 11, wherein the computer services network comprises an Internet service.

13. A method according to claim 12, wherein the Internet service comprises a search service.

14. A method according to claim 11, wherein the fault condition comprises a failure of the network status data to meet a performance threshold.

15. A method according to claim 14, wherein the performance threshold comprises a minimum response time for a user of the networked computer services.

16. A method according to claim 11, further comprising a step of reactivating the one or more features upon restoration of predetermined network status data.

17. A method according to claim 11, further comprising a step of altering the operation of at least one active feature in compensation for deactivating the one or more features.

18. A method according to claim 11, wherein the step of automatically generating comprises executing a rules-based decisioning engine.

19. A method according to claim 18, wherein the rules-based decisioning engine interfaces to a control database storing at least one of the network status data and a set of service fault rules.

20. A method according to claim 11, further comprising a step of manually overriding the automatically generated control commands.

21. A networked computer service comprising a set of features, the networked computer service being monitored for fault management according to a method of:

receiving network status data from a network monitor monitoring a computer services network, wherein network status data comprises at least one of page latency data, processor utilization data, connection data and storage data;

automatically generating, by a control engine of a server device, control commands to remove one or more panels associated with at least one feature based on a fault condition associated with the at least one feature in the network status data while maintaining active features in the set of features to continue to provide a portion of the networked computer service, wherein the set of features normally provide a plurality of panels of information for presentation on one or more web pages provided by the networked computer service to one or more users, each feature corresponding to one or more of the plurality of panels of information, and wherein the fault condition comprises suspension of one or more features; and communicating the control commands to the computer services network to respond to the fault condition by removing the one or more panels associated with the at least one feature based on the fault condition while maintaining the active features in the set of features, thereby allowing the one or more users accessing the networked computer service to continue to receive a portion of the networked computer service, the portion of the networked computer service comprising only the active features while the one or more features associated with the fault condition are at least temporarily removed from the networked computer service, such that the one or more web pages only include panels of information from only active features while panels of information from deactivated features are omitted from the one or more web pages.

22. A networked computer service according to claim 21, wherein the computer services network comprises an Internet service.

23. A networked computer service according to claim 22, wherein the Internet service comprises a search service.

24. A networked computer service according to claim 21, wherein the fault condition comprises a failure of the network status data to meet a performance threshold.

25. A networked computer service according to claim 24, wherein the performance threshold comprises a minimum response time for a user of the networked computer services.

26. A networked computer service according to claim 21, wherein the method further comprises a step of reactivating the one or more features upon restoration of predetermined network status data.

27. A networked computer service according to claim 21, wherein the method further comprises a step of altering the operation of at least one active feature in compensation for deactivating the one or more features.

28. A networked computer service according to claim 21, wherein the step of automatically generating comprises executing a rules-based decisioning engine.

29. A networked computer service according to claim 28, wherein the rules-based decisioning engine interfaces to a control database storing at least one of the network status data and a set of service fault rules.

30. A networked computer service according to claim 21, wherein the method further comprises a step of manually overriding the automatically generated control commands.

31. A system according to claim 1, wherein the automatically generated control commands are conditional such that at least one less than the set of features having a fault condition is deactivated to attempt to isolate the root or greatest contributing cause of the service fault or failure.

\* \* \* \* \*

UNITED STATES PATENT AND TRADEMARK OFFICE
CERTIFICATE OF CORRECTION

PATENT NO. : 7,581,003 B2  Page 1 of 1
APPLICATION NO. : 10/748675
DATED : August 25, 2009
INVENTOR(S) : Macbeth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

Signed and Sealed this

Fourteenth Day of September, 2010

David J. Kappos
*Director of the United States Patent and Trademark Office*